Nov. 10, 1959 B. H. GEYER, JR 2,912,583

REGENERATION DELAY LINE STORAGE SYSTEM

Filed Feb. 11, 1957

INVENTOR.
BERNARD H. GEYER, JR.
BY Wade Koontz AND
S. A. Strickler
ATTORNEYS 2,912,583
Patented Nov. 10, 1959

2,912,583

REGENERATION DELAY LINE STORAGE SYSTEM

Bernard H. Geyer, Jr., North Syracuse, N.Y., assignor to the United States of America as represented by the Secretary of the Air Force Application February 11, 1957, Serial No. 639,591

3 Claims. (Cl. 250—27)

This invention relates to a digital information storage register and particularly to a register capable of storing an increased number of bits of information.

It has heretofore been proposed to increase utility of digital computers by introducing a storage register in which a plurality of bits, or pattern, of information may be stored indefinitely and made available for external use as long as desired. A clear circuit is connected to deliver a clear signal to the register to clear or erase the stored information pattern from the register. The number of bits of information that could be successfully stored has been limited either by the cost and complication of the register or by the attenuation of the signal below a useful level.

According to the present invention a storage register is inserted between the initiate circuit and a digital computer to receive a plurality of bits of information from the initiate circuit and maintain the information available to the computer until the register is cleared by the application of a clear signal.

In the construction according to the invention the register is constructed as a delay line with a regenerative impulser connected to a first end and a reflecting terminal at a second end to effectively double the length at the delay line. The regenerative impulser being responsive to an initiate signal to generate a pulse and apply it to the delay line and also responsive to the return of a reflected pulse to regenerate and reapply the pulse to the first end of the delay line whereby the information is continuously recirculated and may be read out at each regeneration for use by the computer until the clear signal is applied to the pulser to clear the register. To prevent excessive attenuation in the delay line of a large capacity register, a regenerative amplifier may be placed at the reflecting end of the delay line and bilateral amplifiers may be placed intermediate the ends of the delay line.

It is, accordingly, an object of this invention to provide an information storage register for a digital computer.

It is a further object to provide a storage register having increased capacity.

Another object is to provide a storage register utilizing a delay line to store a plurality of bits of information.

Other objects and advantages of the invention will be apparent from the following description taken in conjunction with the accompanying drawing in which.

Figure 1:
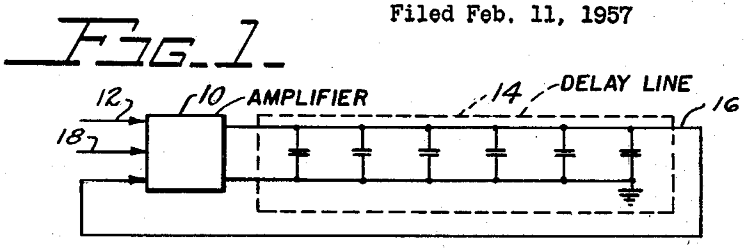
Figure 1 is a schematic diagram of a simplified storage register.

In the construction according to Figure 1 an amplifier device indicated at 10 is responsive to an initiate signal delivered over initiate circuit 12 to deliver an information impulse to a delay line 14. The delay line 14 may be of any desired construction but is preferably constructed as an artificial line utilizing reactance and capacitance as shown in Lair Patent 2,691,727. In addition to the initiate and clear circuits 12 and 18 for putting information into or clearing information from the register, the amplifier 10 contains the necessary gate circuits, etc. to resynchronize the pulses with a master clock frequency. For a given pulse repetition frequency, *f*, this register will store N bits of information where $N=Tf$.

Figure 2:
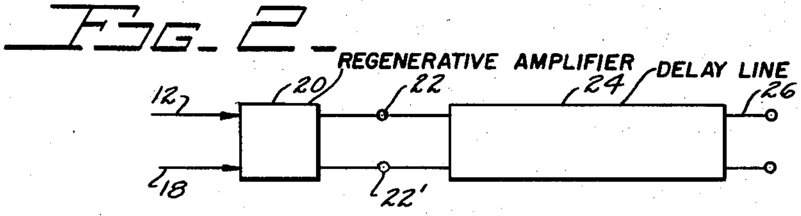
Figure 2 is a similar view of the improved construction doubling the capacity of the register.

In the improvement according to the invention as shown in Figure 2 a regenerative amplifier 20 is provided which is responsive to an initiate signal from initiate circuit 12 to generate a pulse and supply the pulse to a first terminal 22—22' of delay line 24. Delay line 24 is of sufficient length to carry a plurality of pulses and is open circuited at a second terminal 26 at the end remote from the pulse generator of regenerative amplifier 20. The open circuited terminal 26 reflects the pulse without change of polarity so that the reflected pulse travels in the reverse direction in the line to double the effective length of the line. The regenerative device 20 is responsive to the return signal at 22' to regenerate and reapply a pulse of the same polarity.

The operation of the improved circuit is as follows: A pulse is produced by the amplifier 20 in response to an initiate signal from circuit 12. The pulse travels the length of the delay line 24 in T seconds, is reflected with no change of polarity at the open circuited end 26 and returns in an additional time T. Thus, 2T seconds after its initiation it has returned to the first terminal 22—22' and will be regenerated by regenerative amplifier 20. The delay line 24 will therefore accommodate 2T*f* pulses for storage, T*f* of them being propagated down the line, and T*f* more being propagated back at any instant.

Figure 3:
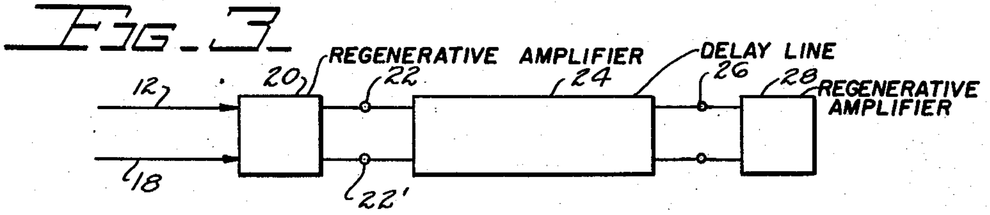
Figure 3 is a modification utilizing regenerative propagation of the information.
Figure 4:
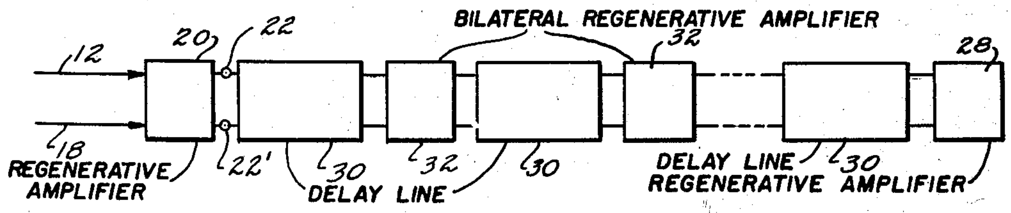
Figure 4 is a further modification according to the invention.

If the required storage capacity of a register is such that the attenuation of the pulse is too severe to allow reliable regeneration by the regenerative amplifier of 20 a second regenerative amplifier 28 may be connected at the end 26, as shown in Figure 3 so that the pulse is regenerated before being returned back down the line, thus allowing twice the length of the line to be used before attenuation becomes too severe.

The capacity of the register may be increased to any desired size by providing a plurality of delay line sections 30 and inserting a bilateral regenerative amplifier 32 between adjacent sections. The amplifier 32 must be capable of independently amplifying signals in both directions simultaneously. The "hybrid coil repeaters" used in telephone circuits are examples of such amplifiers and good results are obtained with the newly developed transistor amplifiers.

Any or all of the regenerating devices 10, 20, 28 and 32 could incorporate resynchronizing or retiming circuits which would serve to keep all signals in synchronism with a master clock frequency regardless of slight variations in the delay lines as well as suitable read out connections to supply the information to any utilizing device. The regenerating devices may obviously be of many forms such as mono-stable or bistable multivibrators, a singe transistor multivibrator gave acceptable results.

Figure 5:
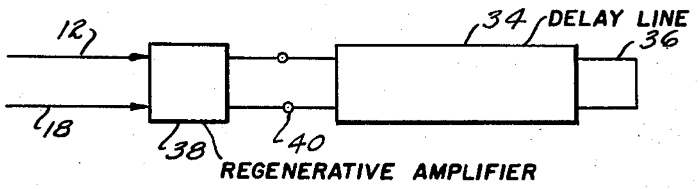
Figure 5 is another modification.

In the modification according to Figure 5, the terminal 36 is short circuited to reverse the polarity of the reflected pulse. A regenerative amplifier 38 is operative to receive a weak signal at terminal 40 and generate a strong signal of opposite potential. For example, the regenerative amplifier 38 acts in response to the initiate signal to deliver a positive pulse to delay line 34 which is reversed to a negative pulse by the short circuit at terminal 36. The arrival of the attenuated negative pulse at terminal 40 will trigger amplifier 38 to produce a strong positive pulse.

For purposes of exemplification, particular embodiments of the invention have been shown and described according to the best present understanding thereof, however, it will be apparent to those skilled in the art that many changes in the construction and arrangement of the parts thereof may be resorted to without departing from the spirit and scope of the invention.

I claim:

1. A digital information storage device for a digital computer having an initiating circuit and a clear circuit comprising a regenerative pulser responsive to an initiating signal, a delay line connected to receive a pulse from said pulser, said delay line having a length operative to store a plurality of pulses, reflecting means at the end of said delay line remote from the end connected to said regenerative pulser, said reflecting means including an amplifier, said regenerative pulser being responsive to a reflected pulse from said delay line to feed a regenerated pulse to said delay line.

2. A digital information storage device for a digital computer having an initiating circuit and a clear circuit comprising a pulser responsive to an initiating signal, a delay line connected to receive a pulse from said pulser, said delay line have a length operative to store a plurality of pulses, reflecting means at the end of said delay line remote from the end connected to said pulser, a bidirectional amplifier connected in said delay line intermediate the ends thereof, said regenerative pulser being operative in response to a reflected pulse from said delay line to feed a regenerated pulse to said delay line.

3. An information storage register for a digital computer having initiate and clear circuits comprising a regenerative pulser operative to produce a pulse in response to an initiate signal, a delay line including a first end connected to receive pulses from said pulser, said delay line having a length operative to store a plurality of successive pulses, a regenerative amplifier connected to the second end of said delay line, said regenerative amplifier being operative to reflect a regenerated pulse over said delay line, said regenerative pulser being responsive to arrival of a reflected pulse to deliver a regenerated pulse to said delay line and a bilateral amplifier connected in series circuit relation intermediate the ends of said delay line.

References Cited in the file of this patent

UNITED STATES PATENTS

| | | |
|---|---|---|
| 2,212,173 | Wheeler | Aug. 20, 1940 |
| 2,433,379 | Levy et al. | Dec. 30, 1947 |
| 2,679,040 | Gloess | May 18, 1954 |
| 2,697,166 | MacNichol et al. | Dec. 14, 1954 |
| 2,755,381 | Woodcock | July 17, 1956 |